Patented May 29, 1934

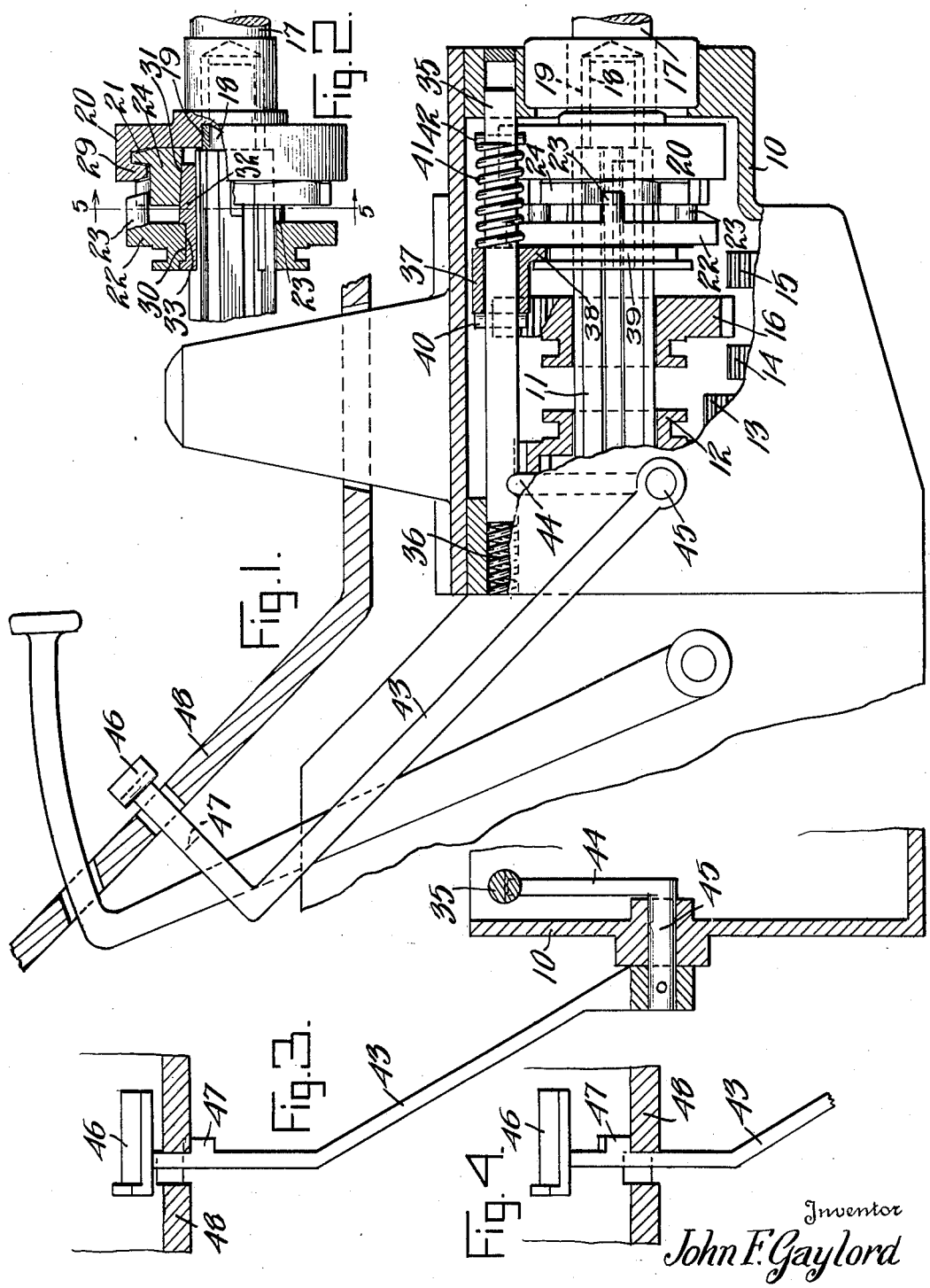

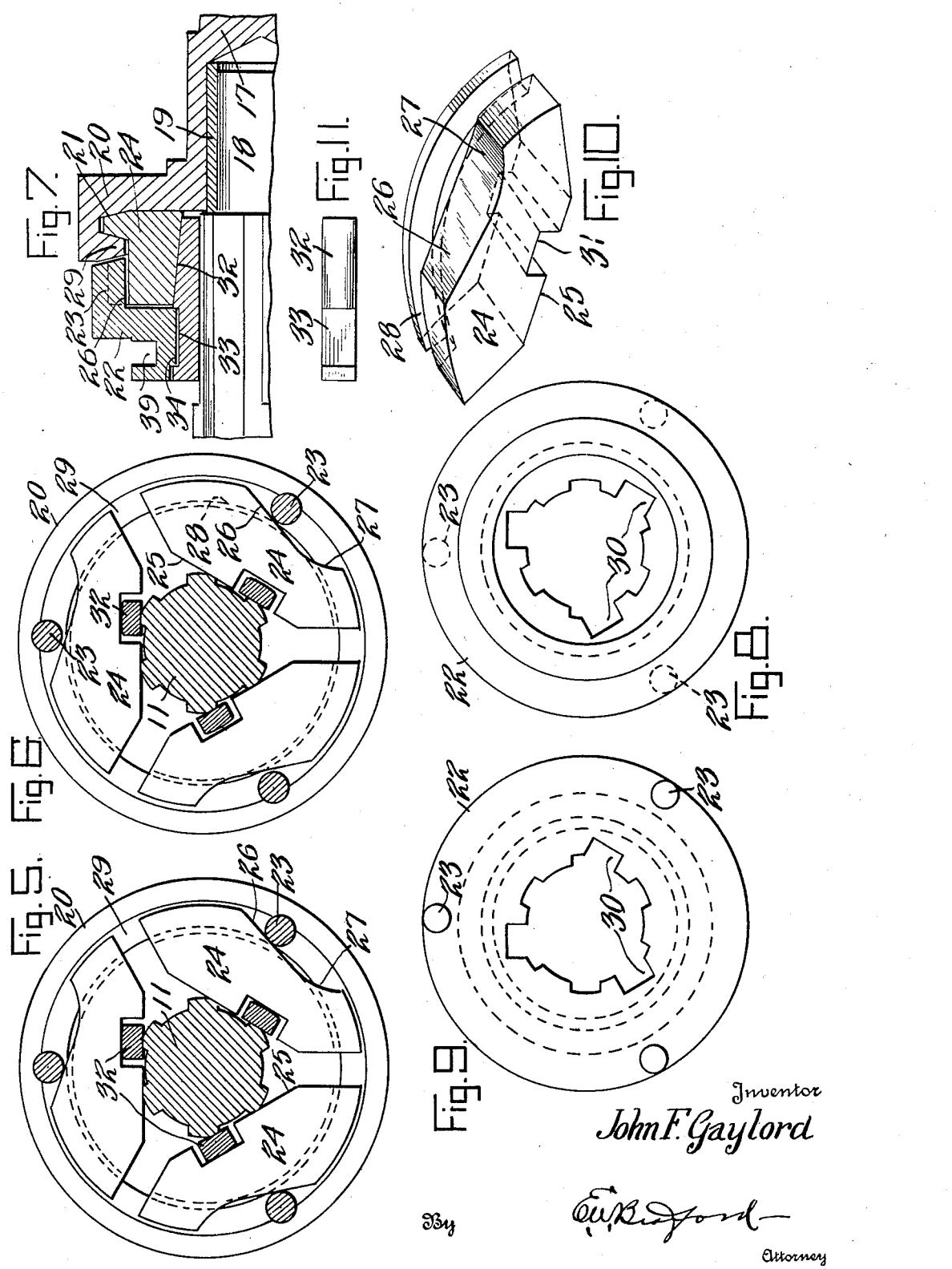

1,960,664

UNITED STATES PATENT OFFICE 1,960,664

FREE WHEELING DEVICE

John Fletcher Gaylord, Muncie, Ind.

Application September 19, 1932, Serial No. 633,858

5 Claims. (Cl. 192—48)

This invention relates to free wheeling devices and its object is to provide a free wheeling device which is simple in construction, and operation by virtue of only a few operating parts.

Referring to the accompanying drawings, which are made a part hereof and on which similar reference characters indicate similar parts, Figure 1 is a side elevation, partly in section, of a portion of a crank case illustrating my invention, Figure 2, a detail view, partly in section, of a portion of the free wheeling clutch, Figure 3, a detail view showing an operating lever or pedal, Figure 4, a similar detail showing the pedal in a different position, Figure 5, a section on line 5—5 of Figure 2 showing the lugs on a clutch control ring in one position, Figure 6 is a similar view with the lugs in another position, Figure 7, a detail in section of the free wheeling clutch, Figure 8, an end view of a clutch control ring looking from the left to right in Figure 7, Figure 9, a view of the clutch control ring looking in the other direction, Figure 10, an enlarged detail of one of the radially movable friction blocks, and Figure 11, a detail view showing an operating wedge or block.

In the drawings numeral 10 indicates the housing in which are mounted a driving shaft 11 which is driven from an engine not shown and the usual gears 12, 13, 14, 15 and 16 for driving the vehicle at the several speeds. A driven shaft 17 is operably connected to the driven elements of the vehicle. The shaft 11 has a small end 18 which seats in a bearing 19 in the end of the shaft 17. The driven shaft 17 has formed therewith an enlarged end or bell 20 in the inner end of which is an annular channel 21. The rear end of the shaft 11 is provided with longitudinal key-ways and about this end of the shaft is positioned a clutch control ring 22. This ring is axially slidable upon the shaft 11 but is prevented by the key-ways from rotating on the shaft. The ring 22 carries lugs 23 spaced about its periphery. Radially movable friction blocks 24 are also positioned about the end of the shaft 11, the inner surfaces 25 of these blocks engaging the shaft 11. The outer surfaces of the blocks are cut away along an approximately straight or plane surface 26 and an arcuate surface 27. The blocks have peripheral grooves 28 into which fit the inwardly extending flange 29 on the enlarged portion 20 of the driven shaft. The groove and the flange 29 cooperate to hold the blocks in fixed axial position. The blocks, however, are permitted a slight radial movement. The clutch control ring 22 is provided with longitudinal notches 30 and the blocks 24 have corresponding notches 31 into which are positioned cam wedges 32. The cam blocks or wedges 32 are notched at 33 into which engages a corresponding portion 34 of the clutch control ring 22 in order to provide operating means for the wedges. Axial movement of the clutch control ring 22 will effect corresponding axial movement of the wedges 32.

An operating shaft 35 is journaled in the housing 10. A spring 36 is seated in the housing, having one end against the end of the shaft 35 and tending to move this shaft to the right in Figure 1. A collar 37 is mounted on the shaft 35 which collar has a depending fork 38 which engages an annular groove 39 in the clutch control ring 22. The collar 37 seats at one end against a pin 40 and at its other end against a spring 41. The spring 41 in turn is held against a pin 42 in the shaft 35. It will be apparent from the structure just described that movement of the shaft 35 to the right will move the clutch control ring 22 to the right. Movement of this ring moves the cam blocks or wedges 32 to the right to move the blocks 24 radially to bring them into frictional contact with the bell 20. It will be apparent also that the collar 37 may move independently of the shaft 35, this movement acting to compress the spring 41. The shaft 35 is operated by a foot pedal 43, the operating connection consisting of an arm 44 attached to or made integral with a shaft 45 to which the pedal 43 is attached. The upper end of the arm 44 engages a notch in the shaft 35. The upper end of the pedal 43 has a toe portion 46 by means of which it is operated by the operator's foot. A lug 47 on the pedal 43 provides means for locking the shaft 35 either in forward or rear position. In Figure 3 the lug 47 is shown positioned beneath the floor board 48 of the car. In this position the parts are locked with the clutch control ring 22 moved forward in the free wheeling position of the vehicle. In order to move into a positive drive of the clutch the operator moves the pedal 43 forward to release the lug 47 at which time the pedal is moved to the position shown in Figure 4 in which position the lug 47 engages above the floor board.

It is desired that the vehicle be positively driven when the car is moved backwards. In order to effect this it will be apparent that when the gear 16 is moved to the rear or to the right as shown in Figure 1 it will carry with it the clutch control ring 22. The gear 16, of course is operated by the usual reversing lever not shown but familiar to all operators. The clutch control ring 22 will be moved against tension of spring 41. When the gear 16 therefore is moved back out of reverse gear position spring 41 will throw out the clutch control ring 22 to restore the parts to free wheeling position.

In operation with the parts in the position shown in Figure 1 the vehicle is in the free wheeling position.

With the shaft 11 rotating in a clockwise direction in Figures 5 and 6 the elevated key portions of the shaft will engage the surface 25 of the blocks 24 and move these blocks into frictional contact with the inner surface of the enlarged portion 20 and provide frictional driving contact between the shaft 11 and the shaft 17. This driving contact will continue so long as the shaft 11 tends to rotate faster than the shaft 17. It will do this so long as the car is being driven by the driving shaft 11. Whenever the shaft 17 tends to rotate faster than the shaft 11, as it will when coasting down grade, the blocks 24 will be brought into contact with pins 23, the surface 26 of these blocks engaging the pins. This will hold the blocks from moving radially and consequently prevent driving contact between their peripheries and the interior of the bell 20. The car may therefore run freely independently of the driving shaft 11 and its associated elements. If the operator wishes to throw the parts into positive frictional driving condition he operates the pedal 43 to release the lug 47 so that the spring 36 may move the shaft 35 to the right to bring the clutch control ring 22 to the right as shown in Figure 7. This will move the wedges 32 to expand blocks 24 and effect a friction drive between these blocks and the bell 20. As previously stated the clutch control ring 22 is always moved to the right whenever the car is moved into reverse gear position.

In operating the locking device it is necessary to speed up the motor to the pulling speed of the car before pushing the locking device back or by pushing out the clutch pedal of the motor. With the motor idling or not running or if the motor should stop when coasting down a hill and it is desired to lock the motor in so that the motor may be used for braking the car, the operator first trips the latch 47 by pushing it forward with the foot. The locking device, however, will not go in at once because there is a pressure on the wedges 32. This pressure must be relieved by pushing the clutch out. Motor compression keeps a pressure on the wedges when the motor is idling or not running. When the car is coasting, the lock cannot be pushed in unless the motor is speeded up to pulling speed or unless the main clutch is pushed out. This insures against any jerking during the changing from free wheeling to positive drive and vice versa.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent is:

1. A device of the kind described comprising a driving shaft and a driven shaft, the driven shaft having a bearing in one end in which the end of the driving shaft is journaled, the driven shaft also having an enlarged bell about the end of the driving shaft, a clutch control ring axially slidable upon the driving shaft and keyed to said shaft to rotate therewith, a plurality of friction blocks positioned in the enlarged end of the driven shaft and movable radially to engage said shaft to effect a friction drive between the driving and the driven shafts, means for holding said friction blocks against radial movement when the driven shaft tends to rotate faster than the driving shaft and for moving said blocks radially when the driving shaft tends to move faster than the driven shaft, and means on the said clutch control ring movable to expand the said blocks radially to effect a positive friction drive at all times between the driving and the driven shafts, substantially as set forth.

2. A device of the kind described comprising a housing having a driving shaft mounted therein, a driven shaft mounted in axial alignment with the driving shaft, said driven shaft having an enlarged end extending over the driving shaft, a clutch control ring keyed to but axially slidable on the end of the driving shaft, said clutch control ring having a plurality of axially extending pins, a plurality of friction blocks positioned about the end of the driving shaft and within the enlarged end of the driven shaft, said blocks having cut-away portions on their peripheries to receive said pins on the said clutch control ring, and means for moving said blocks radially by the driving shaft during normal forward drive of the vehicle and for permitting overrunning of the driven shaft independently of the driving shaft when the driven shaft is driven by power other than that from the driving shaft, substantially as set forth.

3. A device of the kind described comprising a housing having a driving shaft mounted therein, a driven shaft mounted in axial alignment with the driving shaft, said driven shaft having an enlarged end extending over the driving shaft, a clutch control ring keyed to but axially slidable on the end of the driving shaft, said clutch control ring having a plurality of axially extending pins, a plurality of friction blocks positioned about the end of the driving shaft and within the enlarged end of the driven shaft, said blocks having cut-away portions on their peripheries to receive said pins on the said clutch control ring, and means for moving said blocks radially by the driving shaft during normal forward drive of the vehicle and for permitting overrunning of the driven shaft independently of the driving shaft when the driven shaft is driven by power other than that from the driving shaft, a plurality of wedges movable with said clutch control ring, said wedges extending between the inner edges of said friction blocks and the driving shaft whereby axial movement of the wedges will move the friction blocks radially to effect a positive friction drive at all times between the driving and the driven elements, substantially as set forth.

4. A device of the kind described comprising a driven shaft having an enlarged end thereon, a driving shaft having one end seated in the driven shaft, a friction block on the driving shaft movable radially to engage the interior of the enlarged end of the driven shaft, said enlarged end having a tapered groove therein and said block having a complementary tapered periphery adapted to engage in said groove, means for moving said block by the driving shaft to effect a friction drive from the driving to the driven shaft, and radially acting means for holding said block from moving radially outwardly to permit the driven shaft to rotate independently of the driving shaft when the driven shaft is operated by means other than the driving shaft, substantially as set forth.

5. A device of the kind described comprising a driving shaft and a driven shaft, the driven shaft having a bearing in one end in which the end of the driving shaft is journaled, the driven shaft having also an enlarged bell about the end of the driving shaft, said bell having an annular tapered groove on its interior, a plurality of friction blocks positioned in the enlarged end of the driven shaft and having complementary tapered flanges engaging in said groove and movable radially to effect a friction drive between the driving and the driven shafts and radially acting means for holding said blocks against radial movement when the driven shaft tends to rotate faster than the driving shaft and means for moving said blocks radially outwardly when the driving shaft tends to move faster than the driven shaft, substantially as set forth.

JOHN FLETCHER GAYLORD.